United States Patent [19]

Lamberts

[11] Patent Number: 5,930,546
[45] Date of Patent: Jul. 27, 1999

[54] METHOD FOR MAKING A SINUSOIDAL TEST OBJECT

[76] Inventor: Robert L. Lamberts, 236 Henderson Dr., Penfield, N.Y. 14526

[21] Appl. No.: 08/961,474

[22] Filed: Oct. 31, 1997

Related U.S. Application Data

[60] Provisional application No. 60/030,075, Nov. 4, 1996.
[51] Int. Cl.⁶ ................................................... G03B 41/00
[52] U.S. Cl. ............................................. 396/563; 355/52
[58] Field of Search .............................. 396/563; 355/52, 355/35, 71, 77; 430/4–5, 396, 501; 356/443

[56] References Cited

U.S. PATENT DOCUMENTS

| 3,748,019 | 7/1973 | Bestenreiner et al. ................... 350/162 |
| 4,653,909 | 3/1987 | Kuperman .............................. 356/124.5 |
| 4,915,476 | 4/1990 | Hall et al. ................................ 350/163 |
| 4,968,117 | 11/1990 | Chern et al. ........................ 350/162.24 |
| 5,429,908 | 7/1995 | Hokuf et al. .............................. 430/269 |
| 5,739,898 | 4/1998 | Ozawa et al. .............................. 355/53 |

*Primary Examiner*—Safet Metjahic
*Assistant Examiner*—John Chizmar
*Attorney, Agent, or Firm*—Nixon, Hargrave, Devans & Doyle LLP

[57] ABSTRACT

A method for forming a test object containing a sinusoidal pattern corresponding to a specified exposure distribution function comprises: providing an exposed and processed intermediate photographic film containing a distorted sinusoidal pattern image having harmonics necessary to produce a substantially undistorted sinusoidal pattern in an exposed and processed test object photographic film; exposing the test object film using the intermediate film containing the distorted sinusoidal pattern image; and processing the exposed test object film, thereby forming a test object containing a substantially undistorted sinusoidal test pattern.

17 Claims, 5 Drawing Sheets

METHOD FOR MAKING A SINUSOIDAL TEST OBJECT

CROSS REFERENCE TO RELATED APPLICATION

This application claims priority from Provisional Application Ser. No. 60/030,075, filed Nov. 4, 1996 by Robert L. Lamberts, entitled A SINUSOIDAL TEST OBJECT AND METHOD FOR MAKING AND USING SAME.

FIELD OF THE INVENTION

This invention relates to test objects and, more particularly, to a method for making sinusoidal test objects having low distortion over a wide range of modulation.

BACKGROUND OF THE INVENTION

In measuring the modulation transfer characteristics of various image forming systems, it is often desirable to employ a variable transmittance sinusoidal test pattern. The production of photographic sinusoidal test objects having sinusoidal patterns has been described in various places in the scientific literature, for example, in R. L. Lamberts, "The Production and Use of Variable-Transmittance Sinusoidal Test Objects," *Applied Optics,* 1963, Vol. 2, No. 3, pp 273–276, the disclosure of which is incorporated herein by reference.

As described in the Lamberts paper, approximate linearity of the transmittance exposure relationship can be obtained by using a photographic negative material that is printed onto a positive photographic material, the gammas (contrasts) of the films being adjusted to give an overall gamma of negative unity (−1.0). In such instances, there is a linear relationship between the transmittance of the positive material and the exposure received by the negative material. Thus, when a negative film is exposed with a sinusoidal distribution of light and printed on a positive film, the transmittance of the print will also be approximately sinusoidal. Methods known in the art, however, for producing sinusoidal test objects are often limited as to the range over which good linearity can be obtained. A method for making test objects having a wide range of modulation linearity without unacceptably high harmonic distortion is needed. This need is met by the method of the present invention.

SUMMARY OF THE INVENTION

In accordance with the invention, a method for forming a test object containing a sinusoidal pattern corresponding to a specified exposure distribution function comprises: providing an exposed and processed intermediate photographic film containing a distorted sinusoidal pattern image having harmonics necessary to produce a substantially undistorted sinusoidal pattern in an exposed and processed test object photographic film; exposing the test object film using the intermediate film containing the distorted sinusoidal image; and processing the exposed test object film, thereby forming a test object comprising a substantially undistorted sinusoidal test pattern.

DETAILED DESCRIPTION OF THE INVENTION

Figure 1:
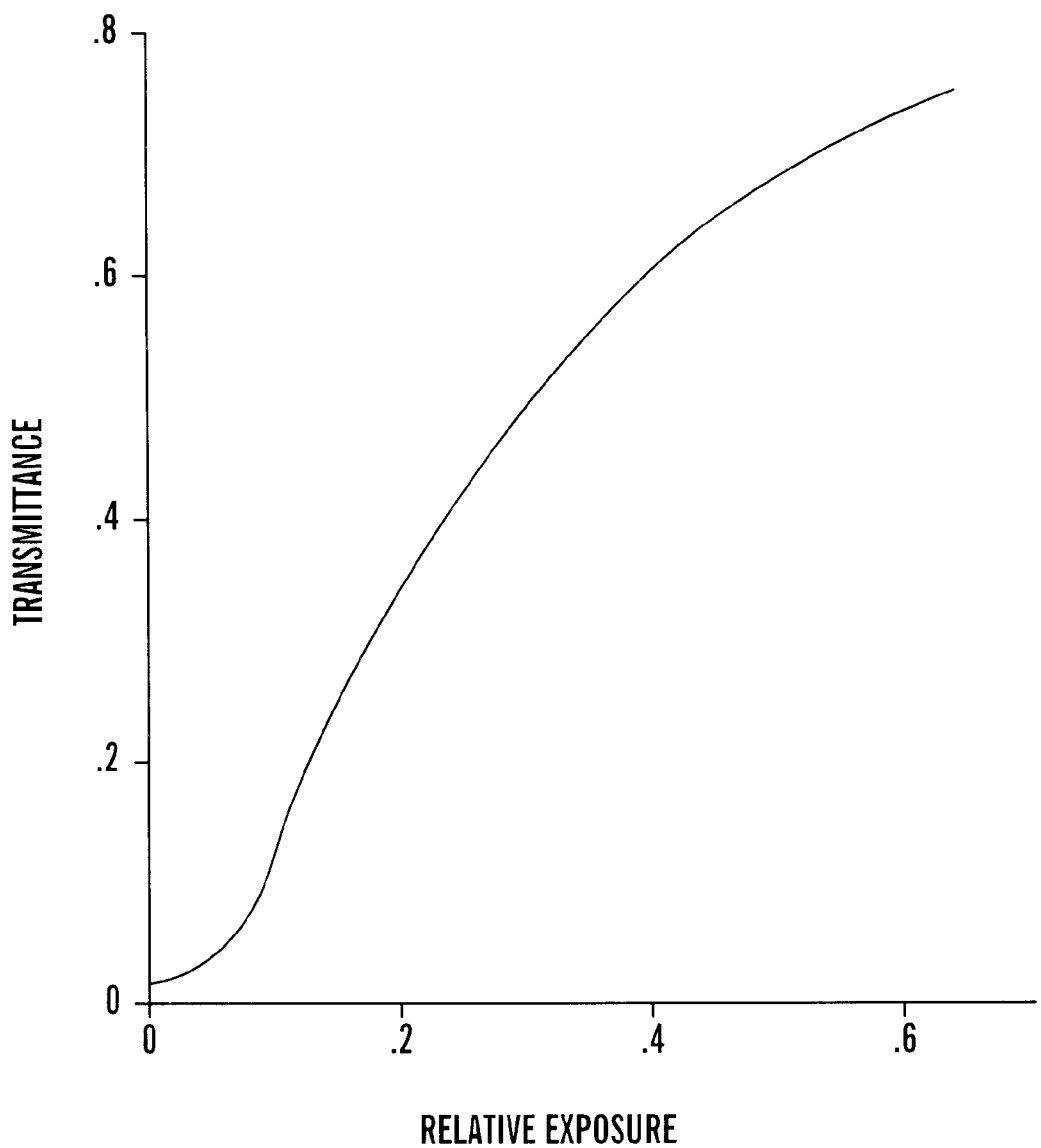
FIG. 1 is a transmittance-exposure curve for a direct reversal photographic material.

As previously noted, a need exists for test objects having a wide range of modulation linearity without excessively high harmonic distortion. A typical transmittance-exposure curve for a direct reversal photographic film is shown in FIG. 1. For a properly chosen exposure on this material, it is possible to produce a pattern having a modulation of about 60%, with harmonic distortion of about 3%. However, harmonic distortion increases rapidly with increasing modulation and would be generally unacceptable for a modulation of 80% or greater.

To overcome these limitations, it is necessary to distort the distribution of the light used to expose a film in such a way as to compensate for its non-linearity so that the sinusoidal pattern resulting on the exposed film is substantially undistorted. A first order calculation of the required exposure can be achieved by assuming a sinusoidal transmittance function and carrying each point of this through the measured curve of the transmittance-exposure (T-E) relationship for the film. Analysis of the resulting exposure distribution function by Fourier techniques enables its expression in the form of a Fourier series. Fourier transform spectral methods are described in chapter 12 of *Numerical Recipes: The Art of Scientific Computing,* and its companion manual, *Numerical Recipes: Routines and Examples in BASIC,* 1986, Cambridge University Press, the disclosures of which are incorporated herein by reference.

The modulation transfer function (MTF) is a graph of the ratio of image contrast to object contrast on the vertical axis versus spatial frequency (cycles/mm or line pairs/mm) on the horizontal axis. The ratio of the modulation in the image to that of the object (the modulation transfer ratio) is a measure of how well the image is formed for that particular spatial frequency. If it were possible to exactly replicate the test object in the image, the MTF would be a straight horizontal line at 1.0. In practice, however, the lines always slope downward to the right, corresponding to a decrease in image contrast with increasing spatial frequency. Lower and mid-range spatial frequencies are especially important in regard to observed image sharpness. The endpoint of the MTF, at zero contrast, is the limiting resolution.

The MTF of a system is equal to the product of the MTF's of each component of a system: film, camera and printer lenses, etc. Thus, when a test object is imaged by a lens, each of the fundamental and harmonic components of a Fourier series representing an exposure distribution function will be degraded by the value of the modulation transfer function (MTF) of each of the system components for the particular spatial frequency. One can then compensate for these effects by dividing the components by the appropriate values of the MTF.

The MTF is related mathematically by a Fourier transform to an image of a line that is known as the line spread function. A line spread function can be integrated to produce an edge function. Conversely, the edge function can be differentiated to yield the line spread function, which is in turn related to the MTF by a Fourier transform. It is distinctly advantageous, however, to use sinusoidal test patterns to determine the MTF because they cover a much larger area and provide a much greater degree of redundancy in the measurements. Various measurement methods are described in J. C. Dainty and R. Shaw, *Image Science*, Chapter 7, "The Modulation Transfer Function," 1974, Academic Press, New York, the disclosure of which is incorporated herein by reference.

Figure 2A:
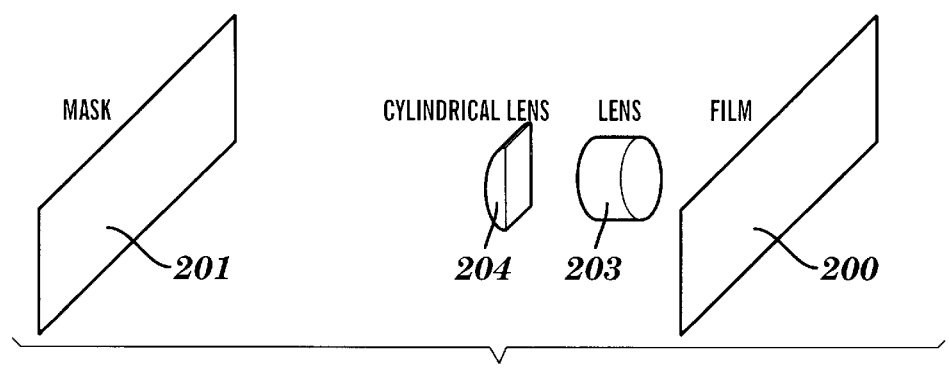
FIG. 2A schematically depicts the imaging of a mask through a cylindrical and conventional lens onto a photographic film to produce a sinusoidal pattern thereon.
Figure 2B:
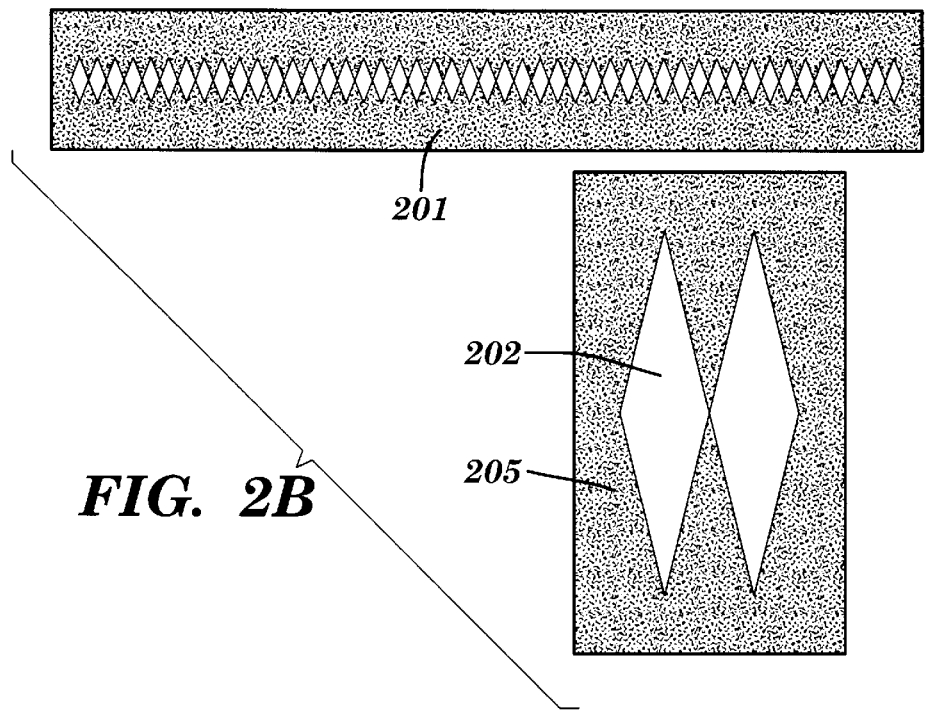
FIG. 2B is a schematic detailed representation of the mask included in FIG. 2A.

One method of producing a test object 200 that includes a properly distorted sinusoidal exposure distribution (not depicted in 200) is shown in FIG. 2A. The required mask 201, whose sinusoidal function 202 is depicted in FIG. 2B, can be produced by the following procedure:

measure the transmission-exposure (T-E) characteristics of the test object photographic film to obtain a T-E curve determine the aim transmittance characteristics of the test object pattern, which may be expressed in the form of a function $$T(x)=T_0(1+M\cos 2\pi fx)$$

pass this aim transmittance function through the T-E curve, thereby obtaining a distorted exposure distribution function subject the distorted exposure distribution function so obtained to Fourier analysis to produce the series function $$E(x)=E_0(1+M_1\cos 2\pi fx+M_2\cos 4\pi fx+M_3\cos 6\pi fx+\dots)$$

divide each coefficient $M_1$, $M_2$, $M_3$, ... of the series function by the MTF of the lens used to expose the film, the value of the MTF corresponding to the spatial frequencies associated with these coefficients, thereby producing a series function having corrected coefficients $M_1'$, $M_2'$, $M_3'$, ...

construct a mask by plotting the series function containing the corrected coefficients, blackening the portion above the resulting line, and combining the resulting pattern with its mirror image The mask 201 (included sinusoidal pattern not shown) is uniformly illuminated and imaged by means of a combination of a conventional lens 203 and a cylindrical lens 204. The combination of lenses 203 and 204 smears the light from the mask so that each point is rendered as a vertical line in the image plane. The intensity of the light in the image plane is then proportional to the width of the mask at that point. A plot of the width of the mask as a function of distance would show a sine function with the proper amount of distortion required to produce a substantially undistorted photographic image. The inset in FIG. 2B depicts an enlarged view of a section 205 of mask 201.

Figure 2C:
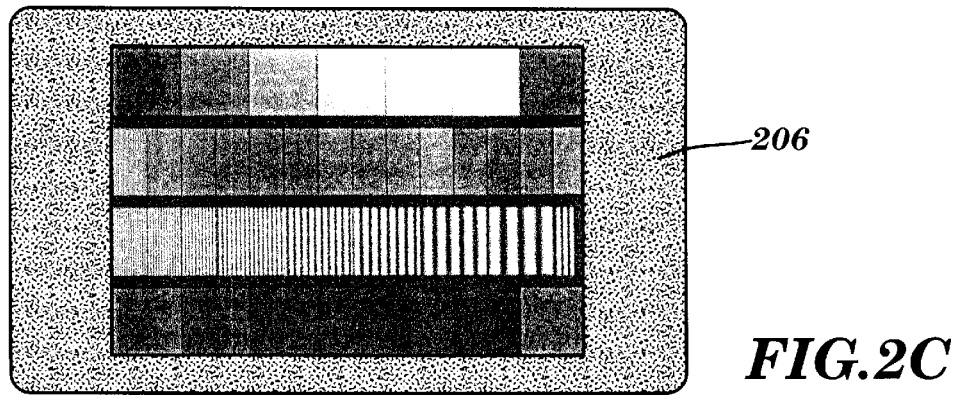
FIG. 2C depicts a test object containing a sinusoidal test pattern and gray scale produced by the method represented in FIG. 2A.

By using this method with a high resolution direct positive film such as Eastman Direct MP Film 5360, it is possible to achieve a modulation of 90% with second and third harmonics having modulation values of less than 2%. With a purely sinusoidal exposure under the same conditions, the second order harmonic distortion would be on the order of 10%. FIG. 2C depicts an example of a sinusoidal test object 206 with gray scales produced by this method.

Figure 3:
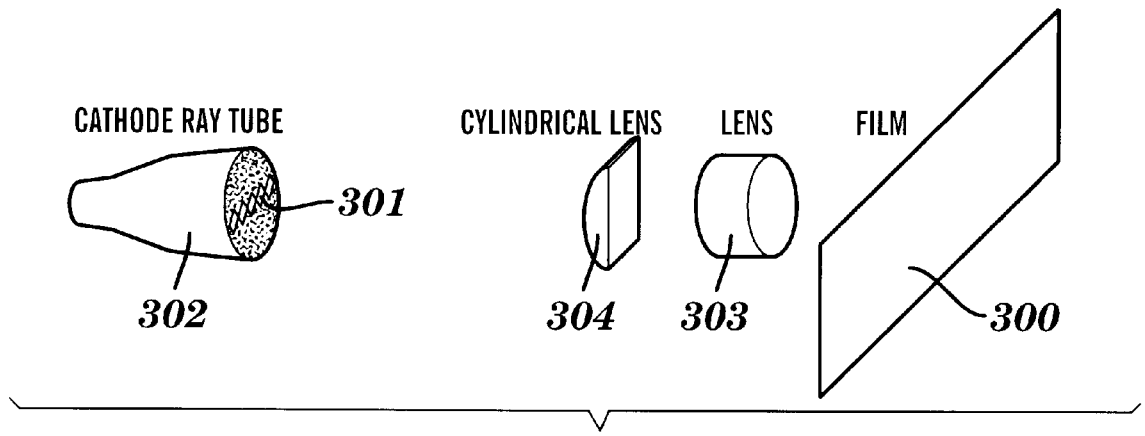
FIG. 3 schematically depicts the imaging of an area-modulated mask pattern on a cathode ray tube through a cylindrical and conventional lens onto a photographic film to produce a sinusoidal pattern thereon.

A second method for carrying out the required exposure is shown in FIG. 3. In this case, the equivalent of the illuminated mask 201 of FIG. 2A is produced by means of an area-modulated pattern 301 on a cathode ray tube (CRT) 302, with the sweep limited in such a way that a uniform illumination is surrounded by a very low light level. The illuminated pattern 301 on CRT 302 passes through conventional lens 303 and cylindrical lens 304 to produce a sinusoidal test object 300 (included sinusoidal pattern not shown), similar to test object 200 depicted in FIG. 2A.

Figure 4:
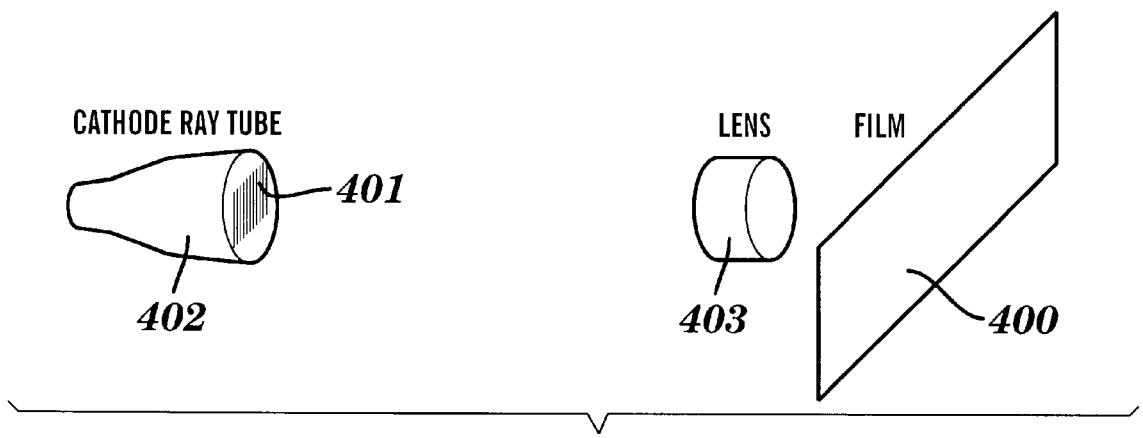
FIG. 4 schematically represents the exposure of a photographic film by an intensity-modulated cathode ray image to form a sinusoidal pattern on the film.

In a third method, schematically shown in FIG. 4, the intensity of an image 401 on a CRT 402 is modulated in such a way that its profile has the distorted sinusoidal form referred to previously. In determining the electronic signal that modulates the light intensity, it is necessary to compensate for the non-linearities of the phosphor response as well as for the non-linearities of the film. The image 401 passes through lens 403 to produce sinusoidal test object 400 (included sinusoidal pattern not shown).

Figure 5A:
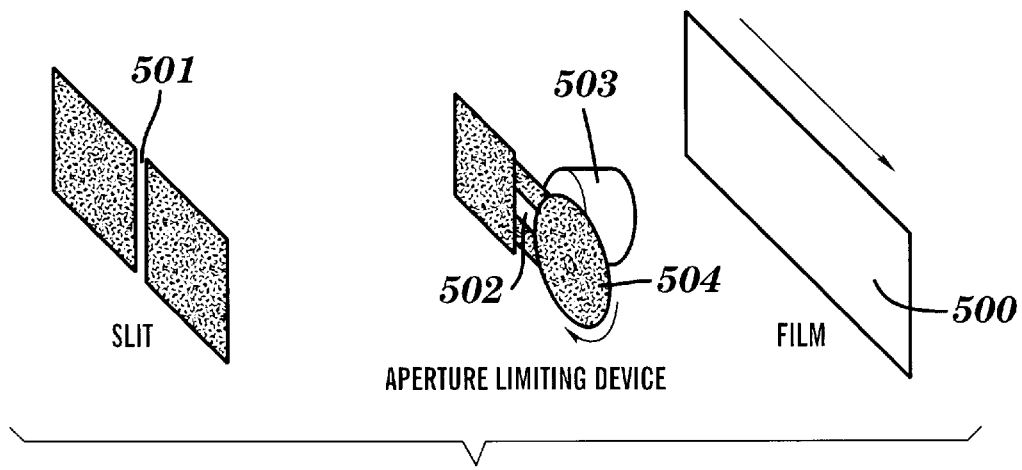
FIGS. 5A and 5B schematically depict the formation of a sinusoidal test pattern of parallel lines on a uniformly and continuously moving test object film exposed by an illuminated slit through an aperture limiting device.

In a fourth method for obtaining a specified exposure distribution, a uniformly illuminated slit is imaged onto a film that is moved uniformly and continuously. The light intensity of the slit image is varied so as to provide the distorted sinusoidal form required to produce a substantially undistorted sinusoidal pattern on the exposed and processed test object film. One method for providing the required light intensity variation is shown in FIG. 5A, whereby a horizontal slit 501 is placed adjacent to the aperture 502 of a lens 503, whose length is varied by an aperture limiting device such as, for example, a rotating eccentric disk 504. The shape of disk 504 must be such that the area of the aperture varies according to the required form. A sinusoidal test object 500 (included sinusoidal pattern not shown) is thereby produced in the exposed and processed film.

Figure 5B:
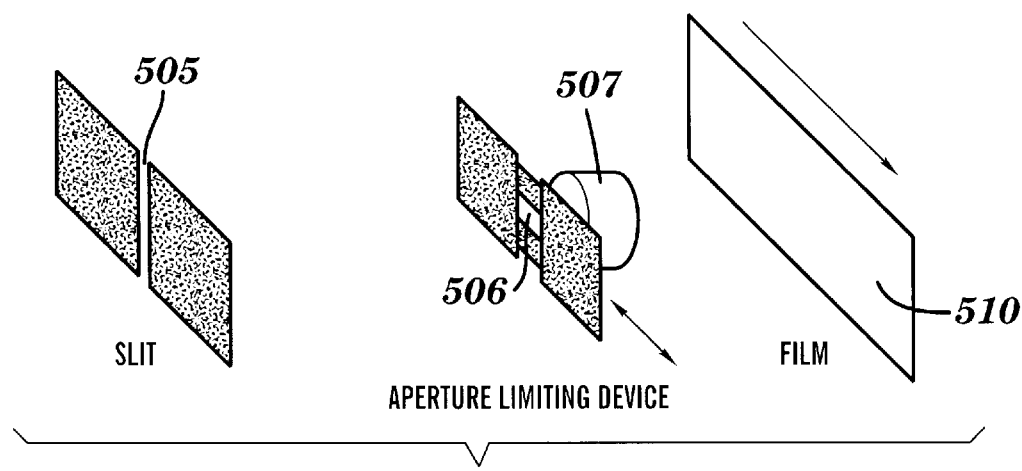

In an alternative method, depicted in FIG. 5B, the aperture is limited by an electromechanical device such as, for example, the pen motion of a strip chart recorder (not shown). The pen motion can be controlled by a device such as a digital to analog converter. This allows a prescribed mathematical function to be generated by a computer and plotted with time by the strip chart recorder or similar device (not shown). By this means, a test object 510 (included sinusoidal test pattern not depicted) is produced in the exposed and processed film.

Figure 6:
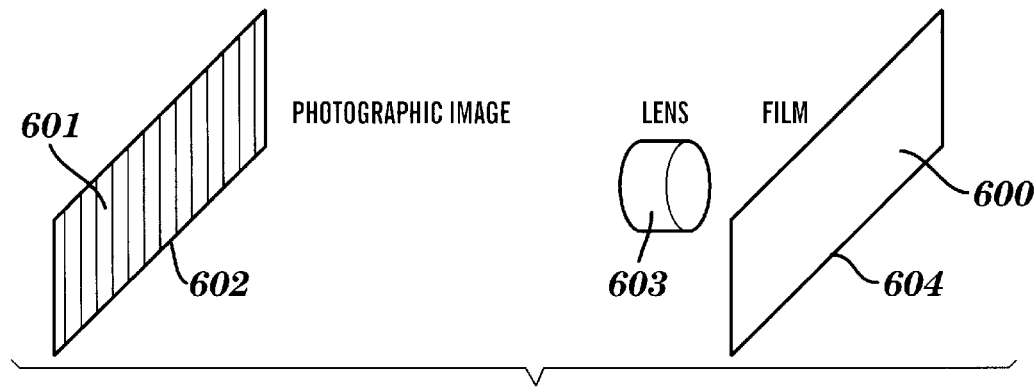
FIG. 6 depicts the imaging of a photographic film pattern on a test object film to produce a sinusoidal test pattern thereon.

A preferred method for producing a test object comprising a specified, substantially undistorted sinusoidal exposure distribution function is shown in FIG. 6. In this case, a photographic image 601 on an exposed and processed intermediate photographic film 602 is provided with characteristics such that, when imaged by an optional lens 603 or contact printed onto a test object film 604, it produces a test object 600 comprising the specified sinusoidal exposure distribution function (not depicted) on the exposed and processed test object film 604. The transmittance exposure distribution represented by image 601 is a sinusoidal pattern that is distorted in such fashion as to compensate for nonlinearities introduced by the intermediate and test object photographic films.

In the method of the invention, a distorted sinusoidal pattern image is provided that contains the harmonics necessary to produce a substantially undistorted sinusoidal pattern in a photographic test object film. The test object film is exposed using the distorted sinusoidal image, then processed to form a test object that contains the substantially undistorted sinusoidal test pattern.

The method of the invention is conveniently carried out employing the following steps:

1. Measure the transmission-exposure (T-E) characteristics of both the photographic film of the product test object and of the intermediate photographic film containing the distorted sinusoidal image. The intermediate and test object films may both be negative films or, more preferably, both positive films. Most preferably, the same high resolution direct positive film, for example, Eastman Direct MP Film 5360, is employed in each instance.

2. Determine the aim transmittance characteristics of the test object pattern, which may be expressed as a function $$T(x)=T_0(1+M\cos 2\pi fx)$$

3. Pass the aim transmittance function of step 2 through the T-E curve of the test object film, thereby obtaining a first distorted exposure distribution function.

4. Subject the first distorted exposure distribution function obtained in step 3 to Fourier analysis to produce the series function $$E(x)=E_0(1+M_1\cos 2\pi fx+M_2\cos 4\pi fx+M_3\cos 6\pi fx+\ldots)$$

5. Divide each coefficient $M_1$, $M_2$, $M_3$, ... of the series function obtained in step 4 by the MTF of the exposing-developing process (the MTF of the test object film for contact printing, the product MTF of Film and lens if exposure is made through a lens) for the corresponding spatial frequency, thereby obtaining the corrected coefficients $M_1'$, $M_2'$, $M_3'$, ...

6. Using the corrected coefficients obtained in step 5, form the series function $$E'(x)=E_0(1+M_1'\cos 2\pi fx+M_2'\cos 4\pi fx+M_3'\cos 6\pi fx+\ldots$$

7. Pass the function E'(x) through the T-E curve of the intermediate film, thereby obtaining a second distorted exposure distribution function 8. Construct a mask by plotting the second distorted exposure distribution function obtained in step 7, blackening the portion above the resulting line, and combining the resulting pattern with its mirror image.

9. Using the mask constructed in step 8, expose and process the intermediate film to produce the required distorted sinusoidal image in the exposed and processed intermediate film.

10. Expose and process the test object film as shown in FIG. 6 to produce the test object containing the desired substantially undistorted sinusoidal pattern.

If the distorted sinusoidal image is on a CRT rather than a photographic film, an analogous process is used, except that brightness-voltage characteristics of the CRT rather than T-E properties of the intermediate film are required in steps 1 and 7 to determine the form of the electronic signal required to produce the image on the CRT.

For certain applications, a pattern is required to include two or more sections in which the sinusoidal variation in one section is shifted in phase relative to that in the other section(s). This can be accomplished by dividing the mask into the required number of sections and providing a phase shift in the function obtained in step 6 between the sections.

Figure 7:
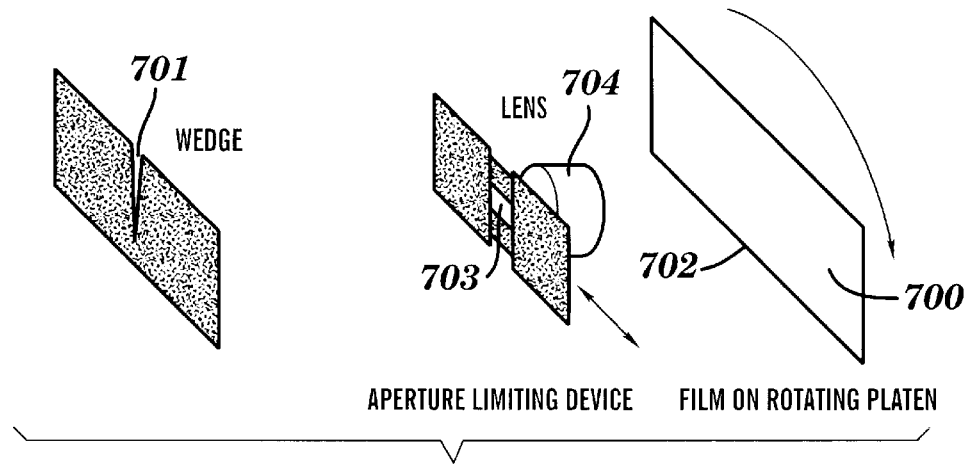
FIG. 7 schematically depicts the formation of a sinusoidal test pattern of radial lines on a uniformly rotated test object film exposed by an illuminated wedge through an aperture limiting device.

For other applications, it is desirable to have a pattern consisting of radial rather than parallel lines. Generating such a pattern can be accomplished as schematically depicted in FIG. 7. Rather than using a parallel slit as previously described in the discussion of FIGS. 5A–B, a wedge 701 is imaged onto a test object film 702 mounted on a rotating platen (not shown). The light used to expose the film is varied through the aperture 703 of a lens 704, using either a rotating eccentric disk (not shown) or an electro-mechanical device (not shown), as previously discussed for FIGS. 5A–B. A test object 700 that contains a substantially undistorted radial sinusoidal pattern (not shown) is thereby produced in exposed and processed test object film 702. Alternatively, the apparatus schematically depicted in FIG. 7 can be employed to form on an intermediate photographic film a sinusoidal pattern image suitably distorted to produce a specified, substantially undistorted sinusidal pattern in an exposed and processed test object film, as previously described in the discussion of FIG. 6.

The sinusoidal test object of the present invention is useful for a wide variety of image evaluation and system control applications. The method of the invention is particularly well suited for replication in arrays of the undistorted sinusoidal pattern. A linear array of the replicated pattern can be useful for evaluating a photographic film employed in a motion picture or television projection system. Formation of a grid array, followed by separation of the individual replicated patterns, can facilitate mass production of a particular sinusoidal test object.

The invention has been described in detail with particular reference to preferred embodiments thereof, but it will be understood that variations and modifications can be effected within the spirit and scope of the invention.

What is claimed is:

1. A method for forming a test object containing a sinusoidal pattern corresponding to a specified exposure distribution function, said method comprising:
   providing an exposed and processed intermediate photographic film containing a distorted sinusoidal pattern image having harmonics necessary to produce a substantially undistorted sinusoidal pattern in an exposed and processed test object photographic film;
   exposing the test object film using the intermediate film containing the distorted sinusoidal image; and
   processing the exposed test object film, thereby forming a test object comprising a substantially undistorted sinusoidal test pattern.

2. The method of claim 1 wherein both the intermediate film and the test object film comprise a negative photographic film.

3. The method of claim 1 wherein the intermediate film and the test object film each comprise a positive photographic film.

4. The method of claim 3 wherein the intermediate film and the test object film comprise the same positive photographic film.

5. The method of claim 1 wherein the substantially undistorted sinusoidal test pattern comprises at least two sections, the test pattern in one section being shifted in phase relative to the test pattern in the other section(s).

6. The method of claim 1 wherein the test object comprises an array of replicated substantially undistorted sinusoidal test patterns.

7. The method of claim 6 wherein the array comprises a linear array.

8. The method of claim 6 wherein the array comprises a grid array.

9. The method of claim 1 wherein the substantially undistorted sinusoidal test pattern comprises radial lines.

10. A method for forming a test object containing a sinusoidal pattern corresponding to a specified exposure distribution, said method comprising the following steps:

(a) measuring the transmission-exposure (T-E) curves of a test object photographic film and an intermediate photographic film;

(b) determining an aim transmittance function $$T(x) = T_0(1 + M\cos 2\pi fx)$$

corresponding to the specified exposure distribution of the sinusoidal pattern of the test object;

(c) passing the aim transmittance function of step (b) through the T-E curve of the test object film, thereby producing a first distorted exposure distribution function $$E(x) = E_0(1 + M_1\cos 2\pi fx + M_2\cos 4\pi fx + M_3\cos 6\pi fx + \ldots);$$

(d) dividing the coefficients $M_1, M_2, M_3, \ldots$ of function $E(x)$ by the modulation transfer function (MTF) of the test object film and, optionally, a lens for exposing said film, thereby obtaining corrected coefficients $M_1', M_2', M_3' \ldots$;

(e) using the corrected coefficients obtained in step (d), producing a second distorted exposure distribution function $$E'(x) = E_0(1 + M_1'\cos 2\pi fx + M_2'\cos 4\pi fx + M_3'\cos 6\pi fx + \ldots);$$

(f) passing the function $E'(x)$ produced in step (e) through the T-E curve of the intermediate film, thereby producing a second distorted exposure distribution function;

(g) constructing a mask corresponding to the second distorted exposure distribution function obtained in step (f);

(h) using the mask obtained in step (g), exposing and processing the intermediate film, thereby producing a distorted sinusoidal image in the exposed and processed intermediate film; and (i) using the distorted sinusoidal image obtained in step (h), exposing and processing the test object film, thereby producing a test object comprising a substantially undistorted sinusoidal test pattern.

11. The method of claim 10 wherein the intermediate photographic film and the test object photographic film each comprise a positive photographic film.

12. The method of claim 11 wherein the intermediate and test object photographic films each comprise the same positive photographic film.

13. The method of claim 10 wherein the substantially undistorted test pattern comprises at least two sections, the test pattern in one section being shifted in phase relative to the test pattern in the other section(s).

14. The method of claim 10 wherein the test object comprises an array of replicated substantially undistorted sinusoidal test patterns.

15. The method of claim 14 wherein the array comprises a linear array.

16. The method of claim 14 wherein the array comprises a grid array.

17. The method of claim 10 wherein the substantially undistorted sinusoidal test pattern comprises radial lines.

* * * * *